P. F. GUTHRIE & T. HAYES.
WASTE FOR BATH TUBS, BASINS, AND LIKE FIXTURES.
APPLICATION FILED APR. 17, 1907.
903,081.
Patented Nov. 3, 1908.
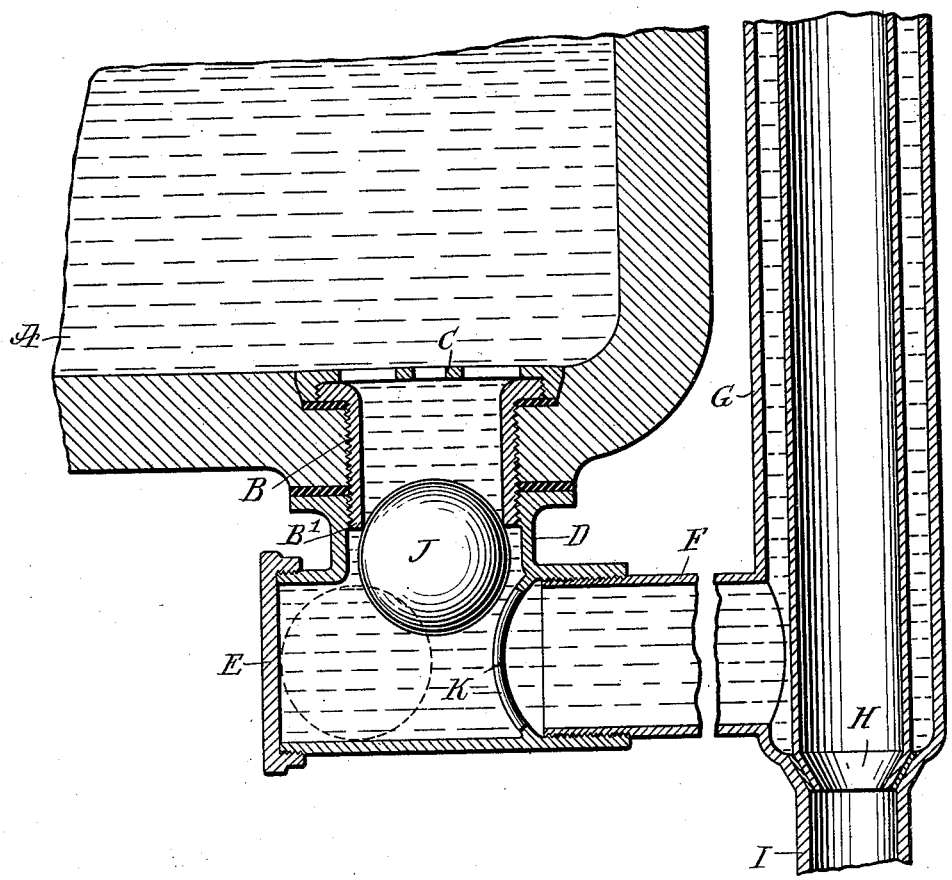
WITNESSES
INVENTORS
Patrick F. Guthrie
Thomas Hayes
BY
ATTORNEYS

UNITED STATES PATENT OFFICE.

PATRICK FRANCIS GUTHRIE AND THOMAS HAYES, OF NUTLEY, NEW JERSEY.

WASTE FOR BATH-TUBS, BASINS, AND LIKE FIXTURES.

No. 903,081.  Specification of Letters Patent.  Patented Nov. 3, 1908.

Application filed April 17, 1907. Serial No. 368,741.

*To all whom it may concern:*

Be it known that we, PATRICK FRANCIS GUTHRIE and THOMAS HAYES, both citizens of the United States, and residents of Nutley, in the county of Essex and State of New Jersey, have invented a new and Improved Waste for Bath-Tubs, Basins, and Like Fixtures, of which the following is a full, clear, and exact description.

The invention relates to wastes for bath tubs, basins and like fixtures, such as shown and described in the Letters Patent of the United States, No. 851,513, granted to us on April 23, 1907.

The object of the present invention is to provide a new and improved waste for bath tubs, basins and like fixtures, arranged to prevent contaminated water rising into the fixture when filling the same with water.

The invention consists of novel features and parts and combinations of the same, which will be more fully described hereinafter and then pointed out in the claim.

A practical embodiment of the invention is represented in the accompanying drawing forming a part of this specification, in which the figure is a sectional side elevation of the improvement as applied to a bath tub.

In the bottom of the bath tub, basin or fixture A is arranged an outlet B covered by a strainer C and connected with a tee D, closed at one end by a cap E and connected at its other end with a waste pipe F leading to a stand pipe G having a manually controlled valve H and a sewer connection I for carrying the waste water of the fixture A to a sewer or other place of discharge, as more fully described in the Letters Patent above referred to, so that further description of this part of the waste is not deemed necessary.

When the bath tub, basin or like fixture A is in use for some time, the stand pipe G and the waste pipe F and connected parts are liable to become fouled by matter adhering to the inside of the said pipes, and when the fixture A is filled with pure water, then water, which is liable to be contaminated and contained in the stand-pipe G, waste-pipe F and tee D, is liable to rise through the outlet B and strainer C into the fixture A, to mix with the pure water therein, especially when the pure water over the strainer is disturbed, such as occurs when the user lifts the pure water with the hands in washing or other operations. Now, in order to prevent such contaminated water from passing into the fixture A, the following device is provided.

Within the tee D is confined a float valve J, such as a hollow ball, made of a light suitable material, and capable of rising when the water fills the fixture A, outlet B, tee D, waste pipe F, and stand pipe G at the time the valve H is closed. The float valve J in rising moves onto a valve seat B' formed on the lower end of the outlet B, to disconnect the latter from the tee D and waste pipe F, thus preventing contaminated water in the waste pipe F and tee D from rising and passing into the fixture A by way of the outlet B. When the valve H is opened for discharging the water in the fixture A, then pressure against the under side of the float valve J by the outflowing water, flowing out of the waste pipe F and tee D, is reduced, and the weight of the water in the fixture A forces the float valve J downward off its seat B', to allow the water to readily flow out of the fixture through the outlet B, tee D, waste pipe F, stand pipe G and sewer connection I.

In order to prevent the float valve J in its descent from closing the waste pipe F, a barrier K is provided, preferably in the form of a curved wire attached to the tee D and extending in front of the entrance to the waste pipe F, so that the float valve J in its descent is directed away from the pipe F towards the cap E, as indicated in dotted lines in the drawing. The float valve J remains in this position during the discharge of the water from the fixture A and as long as the latter remains empty, but as soon as the valve H is closed and the fixture A is again filled with water, the float valve J rises to its seat B' to disconnect the outlet B from the tee D and waste pipe F. Ready access for repairing or cleaning purposes can be had to the float valve J, tee D and pipe F on unscrewing the cap E.

The device is simple in construction and very efficient in action.

Having thus described our invention, we claim as new and desire to secure by Letters Patent:

The combination with a receptacle and a sewer connection provided with a discharge valve, of a vertical outlet pipe for the receptacle, a horizontal pipe with which the vertical pipe communicates, said horizontal pipe discharging into the sewer connection above the valve, the outlet pipe being provided with a valve seat, and the horizontal pipe being extended beyond the outlet pipe to form a recess, a barrier in the horizontal pipe between the sewer connection and the outlet and curving toward said outlet, and a float valve in the horizontal pipe, said barrier acting to move the valve into the recess when said valve moves downwardly, and on to the valve seat when said valve moves upwardly.

In testimony whereof we have signed our names to this specification in the presence of two subscribing witnesses.

PATRICK FRANCIS GUTHRIE. [L. S.]
  THOMAS HAYES. [L. S.]

Witnesses:
 ARTHUR D. BELL,
 W. K. AUSTIN.